United States Patent Office 3,105,039
Patented Sept. 24, 1963

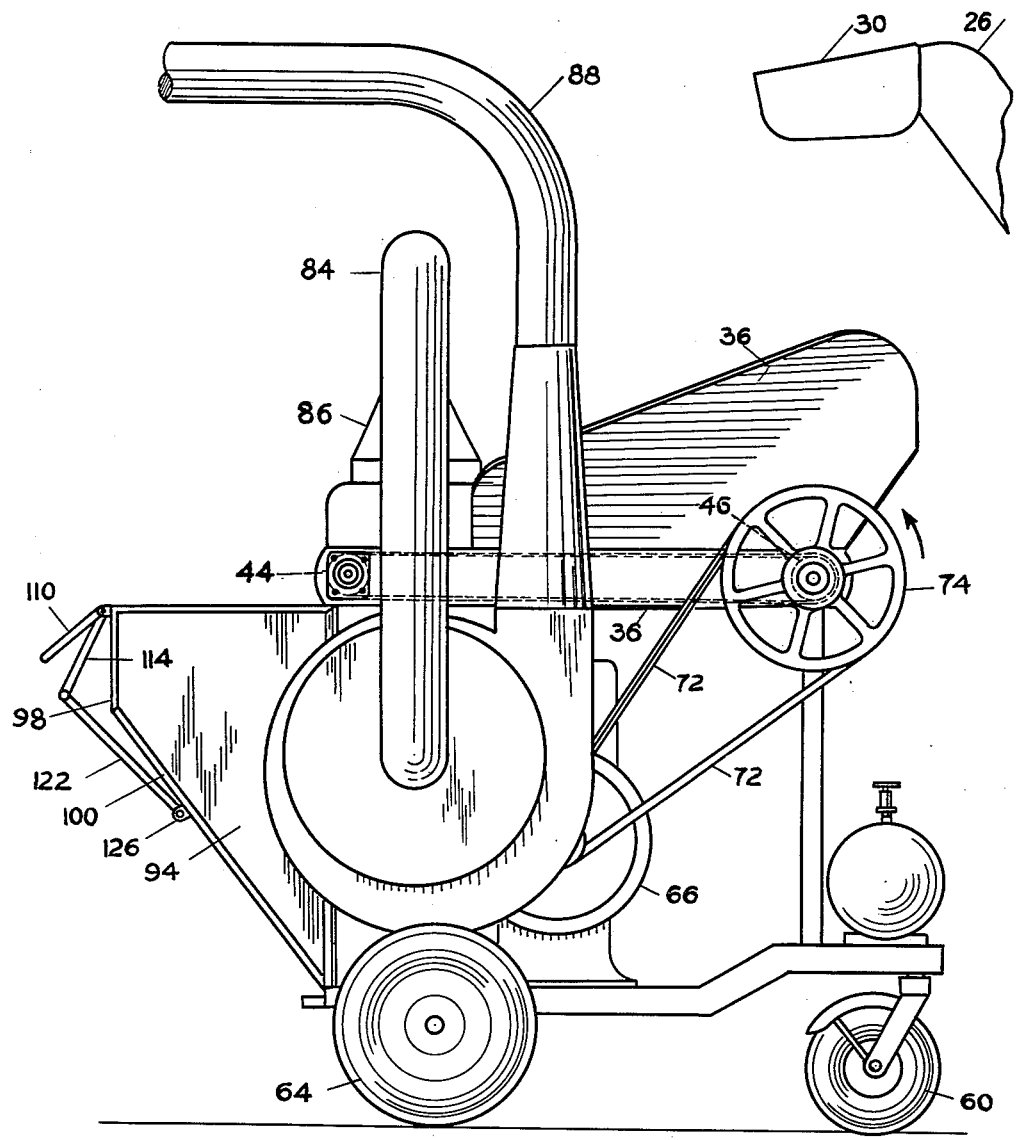

3,105,039
COTTON SEPARATOR
Roy Wrinkle P.O. Box 401, Muleshoe, Tex.
Filed Mar. 16, 1961, Ser. No. 96,170
1 Claim. (Cl. 209—139)

This invention relates to an apparatus for separating good from bad cotton and, more particularly, to an arrangement for separating green and hard unopened cotton bolls from the lighter cotton after the cotton has been stripped in the field.

Cotton is conventionally machine stripped from the plant and, in such cases, the stripper takes all the cotton, both good and bad, and dumps it in a trailer which follows the stripping machine in the field. The problem that presently exists in areas where machines are used is that the farmer takes all of his cotton in the trailer to a cotton gin, the good cotton mixed with the bad. The latter consists largely of green and hard unopened bolls. Separation of good from bad cotton is conventionally one of the first processes that occurs at the cotton gin. The farmer, however, pays the ginner according to the total weight of good and the bad cotton is kept by the gin without any compensation to the farmer. The bad cotton is then rerun by the gin and used as linters for mattress fillings and other uses of low grade cotton.

The present invention provides an arrangement wherein separation occurs in the field, with the machine of the present invention attached behind a conventional cotton stripping machine. The cotton moves from the stripper into the present device which separates the lighter cotton from the heavier cotton, consisting of green or unopened bolls. At intervals in the field, the farmer can drop the green bolls in properly located piles and come back and pick them up at a later date after they have opened. This benefits the farmer in two ways. First, the cotton that he puts in the gin the first time is of overall higher grade and can command a higher price and, second, the farmer can go back to the gin a second time with the bolls which were originally unopened at the time of stripping and thus obtain additional compensation from a second ginning.

It is therefore a primary object of the present invention to provide a new process and apparatus for separating cotton.

Another object of the present invention is to provide an improved process and apparatus for separating good from bad cotton in the field.

Another object of the present invention is to provide a process and apparatus for separating light cotton from heavier unopened cotton bolls.

Another object of the present invention is to provide an improved cotton separator for use in conjunction with a conventional cotton stripper.

Another object of the present invention is to provide an improved vacuum type cotton separator.

Another object of the present invention is to provide an improved cotton separating process.

These and further objects and advantages of the invention will be more apparent upon reference to the following specification, claims and appended drawings wherein:

FIGURE 3 is an opposite side elevation of the separator of FIGURES 1 and 2.

Figure 1:
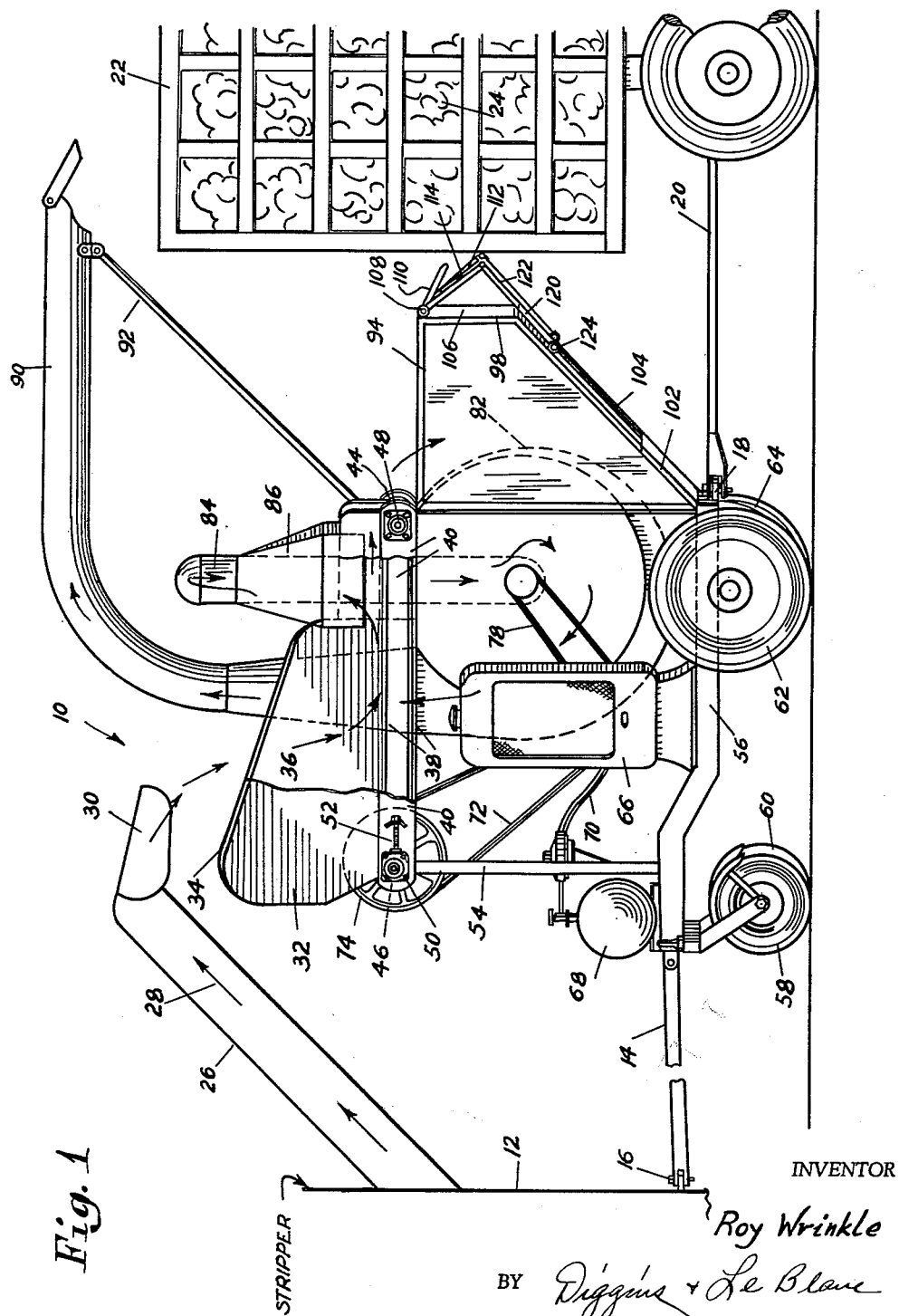
FIGURE 1 is a side elevation of the novel cotton separator of the present invention.

Referring to the drawings, the novel separator of the present invention generally indicated at 10 is constructed for connection to a conventional cotton stripper, the rear portion of which is indicated by the single line 12. Separator 10 is drawn behind stripper 12 and movement is from right to left in FIGURE 1 of the drawings. A drawbar or tongue 14 is provided on the separator for attachment to a suitable coupling 16 at the rear of the cotton stripper.

At the rear of the separator 10 is a trailer hitch 18 for attachment to the drawbar 20 of a trailer 22. Trailer 22 is indicated at 24 as partially filled with cotton ready to be taken to a cotton gin. The entire assembly of stripper, separator and trailer may be tractor-driven in tandem or, alternatively, the stripper may be self-propelled and act to pull the separator and trailer behind it.

Stripped cotton passes up through a conventional blower stack 26 forming a part of the cotton stripper 12 in the direction of the arrows indicated at 28. The stripped cotton leaves the mouth of the stripper stack at 30 and falls by gravity into a catcher 32 forming a portion of the separator 10. Catcher 32 comprises a pair of upwardly and outwardly extending wings or sideboards 34 and 36 best seen in FIGURES 2 and 3, which act to direct the cotton from stack 26 onto a conveyor belt 38. The conveyor belt 38 is supported between a pair of spaced longitudinally extending braces 40 and 42 best seen in FIGURE 2.

Journalled in the opposite ends of braces 40 and 42 are a pair of rollers 44 and 46 around which conveyor belt 38 travels. The rollers are mounted in the longitudinal braces by means of bearings 48 and 50. Threaded adjusting means 52, as seen in FIGURE 1, are provided for adjusting the tension on belt 38.

Longitudial braces 40 and 42 are supported on four uprights, one of which is indicated at 54 in FIGURE 1, forming the basic framework for the separator, which uprights are in turn mounted on a base frame 56. Depending from the forward end of the frame are a pair of front wheels 58 and 60 and from the rear of the frame a pair of larger rear wheels 62 and 64.

Mounted on base member 56 of the frame is a conventional gasoline engine 66 receiving gasoline or other suitable fuel from a fuel tank 68 by way of fuel line 70. Engine 66 drives a pulley belt 72 which passes over a drive pulley 74 connected to front-roller 46 which drives the conveyor belt 38.

Figure 2:
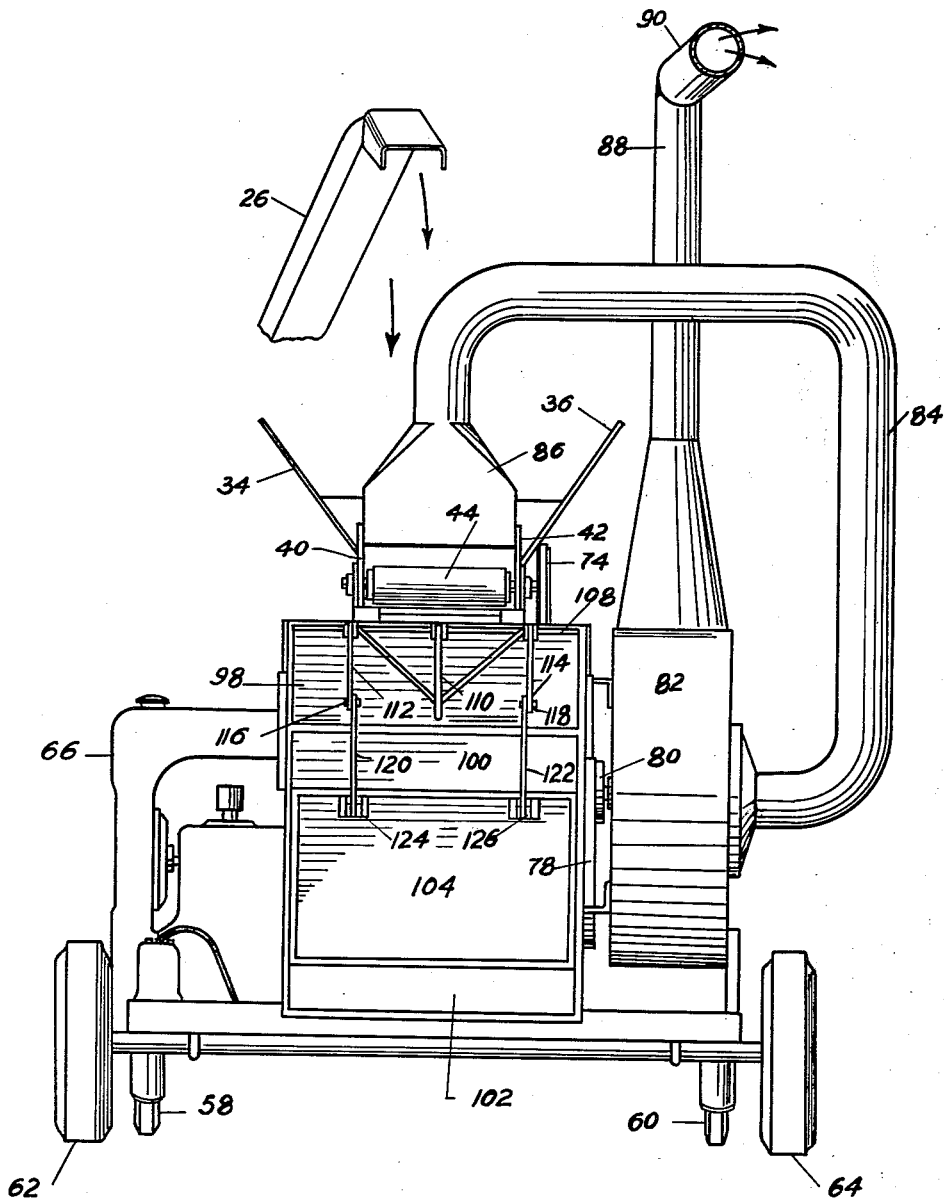
FIGURE 2 is a rear view of the separator of FIGURE 1.

Engine 66 is also connected to a fan belt 78, seen in FIGURES 1 and 2, which belt is connected to a drive pulley 80 to drive a combination exhaust and blower fan 82. As best seen in FIGURE 2, fan 82 is connected on its intake side by way of a vacuum conduit 84 to a vacuum hood 86 positioned directly over the rear end of conveyor belt 38. The exhaust side of fan 82 connects to a blower stack 88 which includes a rearwardly extending arm 90 from which the cotton falls by gravity into the trailer 22. A suitable blower stack brace 92 may be provided to support stack arm 90 with the lower end of the brace 92 suitably connected to the separator frame.

At the rear end of the separator 10 is a hopper 94 into which the heavier cotton, that is, the hard and green unopened bolls fall from the end of the conveyor belt 38. The rear of hopper 94 is formed with a vertical panel 98 and a forwardly sloping lower panel 100. Sloping panel 100 is provided with an aperture 102 normally closed by a sliding door 104.

Vertical panel 98 carries a pair of rearwardly extending flanges at each edge, one of which is indicated at 106 in FIGURE 1. Journalled in these flanges is a rotatable shaft 108 to which is rigidly secured a handle 110. Also rigidly secured to shaft 108 are a pair of bell crank levers 112 and 114 pivoted at 116 and 118 to lower lever arms 120 and 122. The lower ends of these latter lever arms are fastened to suitable brackets 124 and 126 attached adjacent the upper edge of door 104. Upward counterclockwise movement of handle 110 in FIGURE 1 causes bell crank lever arms 112 and 114 to draw door 104 upwardly so that the cotton bolls in hopper 94 are free to pass outwardly through aperture 102.

In operation, the stripped cotton including, both good cotton and heavier bolls, is supplied from stripper 12 by way of blower stack 26 to the separator catcher 32. The mixed cotton then passes along the conveyor 38 in the direction of the arrows until it passes under vacuum head 86. By the choice of a suitable vacuum determined by the speed of rotation of fan 82, air passing around the conveyor belt and upwardly into the vacuum hood draws off the lighter good cotton where it passes through vacuum stack 84 to the intake side of fan 82. At the same time, the heavier unopened bolls are too heavy to be sucked up by the vacuum head 86 and are carried along conveyor belt 38 until they drop over the rear edge of the belt and into hopper 94. The good cotton passes through fan 82 to the exhaust side of this fan and out through blower stack 88 and arm 90 where it falls by gravity into trailer 22.

At predetermined locations in the field, handle 110 is raised to open door 104 so that the collected hard bolls in hopper 94 may be dumped from the separator. These hard bolls are preferably placed in a plurality of neat piles where they are left to the action of the elements for several days until they have fully opened and may be reclaimed by the farmer.

From the above, it is apparent that the present invention provides a novel vacuum process and apparatus for separating good and bad cotton. An important feature of the invention includes the provision of a regulated vacuum adjusted to withdraw good cotton while permitting the heavier undesirable cotton bolls to fall from a conveyor belt into a retaining hopper in the traveling machine. A further important feature of the present invention is the provision of dump means in the hard boll hopper whereby the hopper may be periodically emptied at the desired locations so that the heavy bolls may be neatly piled and reclaimed at a later time when they have opened into desirable cotton. The invention makes it possible to separate the cotton right in the field, and not only acts to increase the value of the initial batch of preginned cotton, but further makes it possible to later reclaim originally undesirable cotton bolls which have been removed from the plants by the cotton stripper. The net result is a substantial increase in both the quantity and the quality of cotton supplied to the cotton gin by the farmer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed and desired to be secured by United States Letters Patent is:

A machine for separating cotton in the field comprising a frame mounted on a plurality of wheels, a catcher for receiving cotton mixed with heavier unopened cotton bolls from a cotton stripper supported by said frame, a horizontal conveyor belt having a first and second end, said first end of said conveyor belt communicating with the bottom of said catcher, an engine mounted on said frame, said engine driving a rotary impeller mounted in a housing on said frame, a vacuum hood and stack communicating with the intake side of said impeller housing, said hood being positioned over and intermediate said first and second ends of said conveyor belt, said engine driving said impeller at a speed sufficient to withdraw said cotton from said conveyor belt in a vertical direction through said hood and stack but insufficient to remove said heavier bolls from said belt, a blower stack communicating with the exhaust side of said impeller housing and including an upwardly and outwardly extending arm for delivering cotton from said conveyor belt to a trailer, and a hopper positioned adjacent said second end of said belt for receiving bolls falling from the end of said belt, said hopper including a door for periodically dumping said bolls from said hopper.

References Cited in the file of this patent
UNITED STATES PATENTS

| | | |
|---|---|---|
| 1,147,078 | Dickerson | July 20, 1915 |
| 2,339,295 | Rust | Jan. 18, 1944 |
| 2,502,817 | Bennett | Apr. 4, 1950 |
| 2,645,821 | Fowler | July 21, 1953 |
| 2,680,338 | Space | June 8, 1954 |
| 2,762,506 | Fine | Sept. 11, 1956 |
| 2,791,001 | Roscoe et al. | May 7, 1957 |
| 2,807,925 | Andrews | Oct. 1, 1957 |
| 2,861,298 | Fowler | Nov. 25, 1958 |